(12) United States Patent
Zhang et al.

(10) Patent No.: US 7,515,173 B2
(45) Date of Patent: Apr. 7, 2009

(54) HEAD POSE TRACKING SYSTEM

(75) Inventors: Zhengyou Zhang, Redmond, WA (US); Ruigang Yang, Chapel Hill, NC (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 10/154,892

(22) Filed: May 23, 2002

(65) Prior Publication Data

US 2003/0218672 A1 Nov. 27, 2003

(51) Int. Cl.
*H04N 7/14* (2006.01)

(52) U.S. Cl. ............... 348/14.16; 348/14.08; 348/14.01

(58) Field of Classification Search ... 348/14.01–14.09, 348/14.1, 14.11, 14.12, 14.13, 14.16, 169; 382/118, 154

See application file for complete search history.

(56) References Cited

U.S. PATENT DOCUMENTS

| | | | |
|---|---|---|---|
| 5,321,749 A | 6/1994 | Virga | |
| 5,359,362 A | 10/1994 | Lewis et al. | |
| 5,577,125 A | 11/1996 | Salahshour et al. | |
| 5,727,062 A | 3/1998 | Ritter | |
| 5,825,879 A | 10/1998 | Davis | |
| 5,898,779 A | 4/1999 | Squilla et al. | |
| 6,046,763 A | 4/2000 | Roy | |
| 6,064,739 A | 5/2000 | Davis | |
| 6,072,496 A | 6/2000 | Guenter et al. | |
| 6,072,873 A | 6/2000 | Bewick | |
| 6,246,768 B1 | 6/2001 | Kim | |
| 6,304,288 B1 | 10/2001 | Hamagishi | |
| 6,606,406 B1 | 8/2003 | Zhang et al. | |
| 6,731,756 B1 | 5/2004 | Pizano et al. | |
| 6,807,290 B2 * | 10/2004 | Liu et al. | 382/118 |
| 6,865,431 B1 | 3/2005 | Hirota et al. | |
| 7,055,038 B2 | 5/2006 | Porter et al. | |
| 7,096,204 B1 | 8/2006 | Chen et al. | |
| 7,197,648 B2 | 3/2007 | Evans | |
| 7,202,875 B2 | 4/2007 | Foehr et al. | |
| 7,206,940 B2 | 4/2007 | Evans et al. | |
| 7,272,726 B2 | 9/2007 | Evans | |
| 7,284,135 B2 | 10/2007 | Evans et al. | |
| 7,293,178 B2 | 11/2007 | Evans et al. | |
| 7,302,586 B2 | 11/2007 | Evans | |
| 2002/0103964 A1 | 8/2002 | Igari | |

(Continued)

FOREIGN PATENT DOCUMENTS

GB 2351628 A * 1/2001

OTHER PUBLICATIONS

Essa et al.; Modelling, tracking and interactive animation of Faces and Heads // using input from Video; IEEE Computer Animation '96 proceedings; Inspec Accession No. 5369619.*

(Continued)

*Primary Examiner*—Melur Ramakrishnaiah

(57) ABSTRACT

Video images representative of a conferee's head are received and evaluated with respect to a reference model to monitor a head position of the conferee. A personalized face model of the conferee is captured to track head position of the conferee. In a stereo implementation, first and second video images representative of a first conferee taken from different views are concurrently captured. A head position of the first conferee is tracked from the first and second video images. The tracking of head-position through a personalized model-based approach can be used in a number of applications such as human-computer interaction and eye-gaze correction for video conferencing.

16 Claims, 8 Drawing Sheets

U.S. PATENT DOCUMENTS

| | | | |
|---|---|---|---|
| 2003/0017846 | A1 | 1/2003 | Estevez et al. |
| 2003/0059047 | A1 | 3/2003 | Iwamura |
| 2003/0093683 | A1 | 5/2003 | Wong et al. |
| 2006/0123248 | A1 | 6/2006 | Porter et al. |
| 2006/0126849 | A1 | 6/2006 | Shirakawa et al. |

OTHER PUBLICATIONS

U.S. Appl. No. 09/528,827, filed Mar. 20, 2000, Microsoft Corporation.

Sumit Basu, Irfan Essa, Alex Pentland, "Motion Regularization for Model-Based Head Tracking." In Proceedings of International Conference on Pattern Recognition, Wien, Austria, 1996 IEEE, pp. 611-616.

Michael J. Black, Yaser Yacoob, "Tracking and Recognizing Rigid and Non-Rigid Facial Motions using Local Parametric Models of Image Motion." In Proceedings of International Conference on Computer Vision, pp. 374-381, Cambridge, MA, 1995 IEEE.

C. Choi, K. Aizawa, H. Harashima & T. Takebe, "Analysis and Synthesis of Facial Image Sequences in Model-Based Image Coding," IEEE Circuits and Systems for Video Technology, vol. 4, No. 3, Jun. 1994, pp. 257-275.

T. Darrell, B. Moghaddam & A. Pentland, "Active Face Tracking and Pose Estimation in an Interactive Room." In IEEE Computer Vision and Pattern Recognition, pp. 67-72, 1996.

D. Decarlo, D. Metaxas, "Optical Flow Constraints on Deformable Models with Applications to Face Tracking," International Journal of Computer Vision 38(2), 99-127, 2000.

T. Horprasert, Y. Yacoob & L. S. Davis, "Computing 3-D Head Orientation from a Monocular Image Sequence." In International Conference Automatic Face and Gesture Recognition, pp. 242-247, 1996.

Z. Liu, Z. Zhang, C. Jacobs, M. Cohen, "Rapid Modeling of Animated Faces From Video." In the Third International Conference on Visual Comupting (Visual 2000), pp. 58-67, Mexico City, Sep. 2000. Also available as Technical Report MSR-TR-99-21.

R. Newman, Y. Matsumoto, S. Rougeaux & A. Zelinsky, "Real-Time Stereo Tracking for Head Pose and Gaze Estimation." In Proceedings of the Fourth IEEE International Conference on Automatic Face and Gesture Recognition (FG 2000), pp. 122-128, Grenoble, France, 2000.

J. Shi & C. Tomasi, "Good Features to Track." In the IEEE Conf. on Computer Vision and Pattern Recognition, pp. 593-600, Washington, Jun. 1994.

H. Li, P. Roivainen, & R. Forchheimer, "3-D Motion Estimation in Model-Based Facial Image Coding," IEEE Pattern Analysis and Machine Intelligence, 15(6):545-555, Jun. 1993.

Chen, E. and Williams, L., "View Interpolation for Image Synthesis," in SIGGRAPH, 1993, pp. 1-7.

Cox, Ingemar J. et al., "A Maximum Likelihood Stereo Algorithm," Computer Vision and Image Understanding, 63:3, May 1996, pp. 542-567 (1-47).

Gemmell, Jim et al., "Gaze Awareness for Video-conferencing: A Software Approach," IEEE MultiMedia, Oct.-Dec. 2000, pp. 26-35.

Kolmogorov, Vladimir et al., "Multi-camera Scene Reconstruction via Graph Cuts," In Proc. Europ. Conf. Computer Vision, Copenhagen, Denmark, May 2002, pp. 1-16.

Ohta, Yuichi et al., "Stereo by Intra- and Inter-Scanline Search Using Dynamic Programming," IEEE Transactions on Pattern Analysis and Machine Intelligence, vol. PAMI-7, No. 2, Mar. 1985, pp. 139-154.

Roy, Sebastien et al., "A Maximum-Flow Formulation of the N-camera Stereo Correspondence Problem," IEEE Proc. of Int. Conference on Computer Vision, Bombai, Jan. 1998, pp. 492-499.

Scharstein, Daniel et al., "A Taxonomy and Evaluation of Dense Two-Frame Stereo Correspondence Algorithms," Int. J. Computer Vision, 47(1-3); 7-42, 2002, (10 pages).

Vetter, Thomas, "Synthesis of novel views from a single face image," Max-Planck-Institut, Germany, Technical Report No. 26, Feb. 1996, pp. 1-13.

Sun, Jian et al., "Stereo Matching Using Belief Propagation," A. Heyden et al. (Eds): ECCV 2002, LNCS 2351, pp. 510-524, 2002.

Belhumeur, Peter N. et al., "A Bayesian Treatment of the Stereo Correspondence Problem Using Half-Occluded Regions," in IEEE Conf. On Computer Vision and Pattern Recognition, 1992, 8 pages.

Ishikawa, Hiroshi et al., "Occlusions, Discontinuities, and Epipolar Lines in Stereo," in the Fifth European Conference on Computer Vision (ECCV '98), Jun. 2-6, 1998, Freiburg, Germany, pp. 1-14.

Szeliski, Richard, "Prediction Error as a Quality Metric for Motion and Stereo," Vision Technology Group, Microsoft Research, Sep. 20-25, 1999, Proceedings of the Int'l. Conf. on Computer Vision, vol. 2, Corfu, Greece, 8 pages.

Bobick, Aaron F. et al., "Large Occlusion Stereo," HCV 1999, pp. 1-25.

Loop, Charles et al., "Computing Rectifying Homographies for Stereo Vision," Apr. 8, 1999, Technical Report MSR-TR-99-21, 14 pages.

Zhang, Zhengyou et al., "Robust and Rapid Generation of Animated Faces From Video Images: A Model-Based Modeling Approach," Technical Report, MSR-TR-2001-101, 32 pages.

Lu, Le et al., "Model- and Exemplar-based Robust Head Pose Tracking Under Occlusion and Varying Expression," Microsoft Research China, pp. 1-8.

* cited by examiner

HEAD POSE TRACKING SYSTEM

TECHNICAL FIELD

This invention relates to video conferencing, and more particularly, to a head position tracking in video conferencing.

BACKGROUND

In the last few years, three dimensional (3D) head tracking in a video sequence or relative pose estimation from multiple images has been recognized as an essential prerequisite for robust facial expression/emotion analysis, and synthesis of face recognition. Tracking 3D head pose is also an important component for correcting for eye-gaze in video-conferencing, by helping to achieve and preserve eye-contact between participants of a video conference in a desktop environment.

Most conventional 3D head pose systems can be characterized as suffering from one or more of the following drawbacks: (1) they are unable to capture head position images accurately; (2) they are limited in the amount range of head motions the systems can track; and/or (3) they require considerable amounts of processing making real-time applications impractical.

SUMMARY

A model-based head pose tracking system is described. In one implementation, video images representative of a conferee's head are received and evaluated with respect to a reference model to monitor a head position of the conferee. The following implementations, therefore, introduce the broad concept of using an individualized three-dimensional head model, to perform head tracking.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The following discussion is directed to model-based head position tracking systems and methods. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

There are several applications in which tracking the head-position of a person is an important component. Such applications include, for example, human-computer interaction and eye-gaze correction for video conferencing. It should be noted that while the exemplary head-positioning implementations described below are mainly directed to correcting for eye-gaze in video conferencing, these head-positioning techniques can be used independently of or in conjunction with other applications such as with the human-computer interaction.

Figure 1:
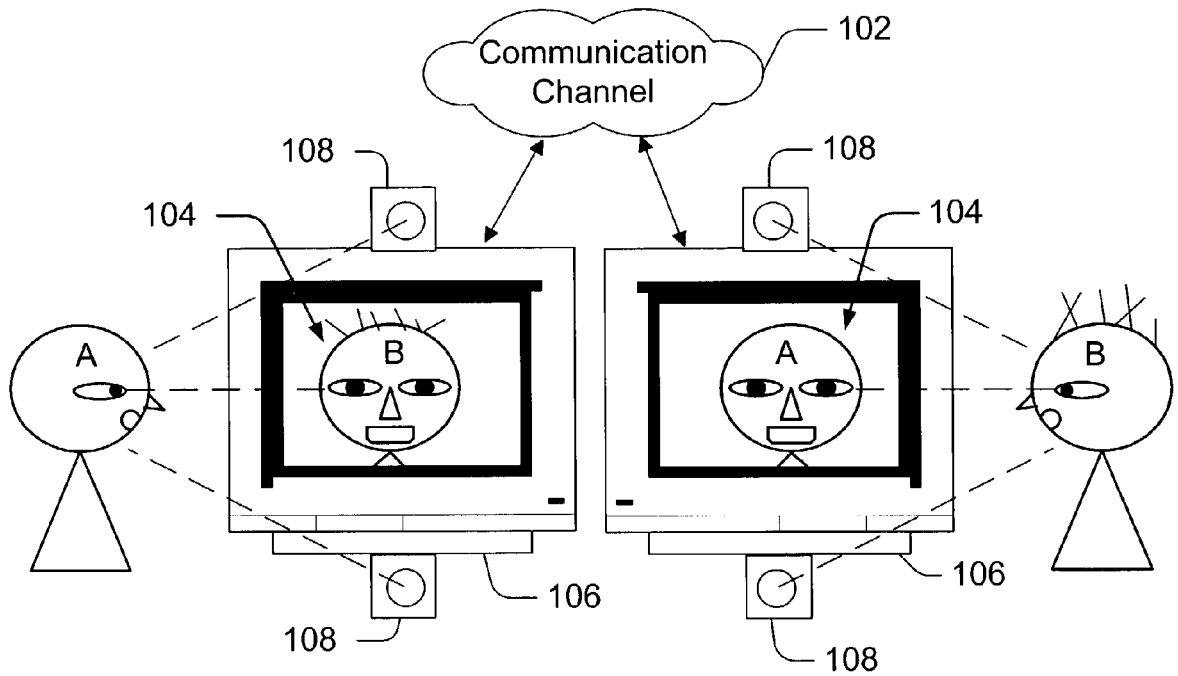
FIG. 1 shows two conferees participating in a video teleconference over a communication channel.

FIG. 1 shows two conferees (A and B in different locations) participating in a video teleconference over a communication channel 102. The communication channel 102 can be implemented through any suitable communication link, such as, a local area network, a wide area network, the Internet, direct or wireless connection, etc.). Normally, conferees A and B would orient themselves in front of their respective display monitors 106. Each of the conferees is able to view a virtual image video stream 104, in real-time, of the other conferee shown on their respective display monitors 106. The virtual image video stream 104 makes each conferee appear to be making direct eye contact with the other conferee on their respective display monitors 106.

The virtual video image stream 104 is produced by a video teleconferencing system to be described in more detail below. In one exemplary implementation, the video teleconferencing system includes two cameras 108, per system, which are vertically mounted on the top and bottom of a display monitor 106. The cameras 108 capture a stereoscopic view of their respective conferee (A/B). In other implementations, additional cameras may be used to capture an image of a conferee. Moreover, the placement of the cameras 108 can be setup to capture different views of the conferees, by mounting the cameras on either lateral side of the display monitor 106 or placing the cameras in other positions not necessarily mounted on the monitors, but capable of capturing a frontal view of the conferee. In any event, the video-teleconferencing system produces a virtual video image stream 104 of each conferee that makes it appear as if the videos of each conferee A and B were captured from a camera directly behind the display monitors 106.

Exemplary Video-Teleconferencing System

Figure 2:
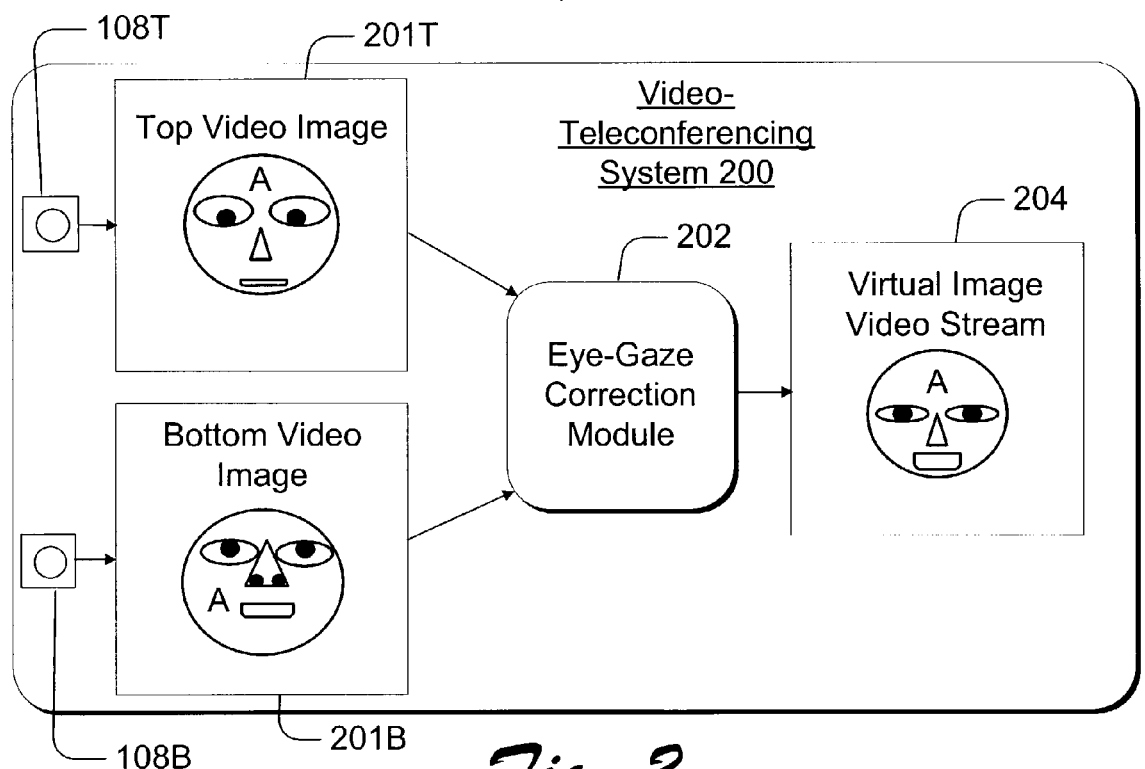
FIG. 2 illustrates functional components of an exemplary video-teleconferencing system that permits natural eye-contact to be established between participating conferees in a video conference; thus, eliminating eye-gaze.

FIG. 2 illustrates functional components of an exemplary video-teleconferencing system 200 that in conjunction with a display monitor shown in FIG. 1, permit natural eye-contact to be established between participating conferees in a video conference; thus, eliminating eye-gaze.

Teleconferencing system 200 can be implemented on one or more typical processing platforms, such as a personal computer (PC) or mainframe computer. A representative example of a more detailed a platform is described with reference to FIG. 12. Generation of a virtual image video stream 204 can, however, be performed at any location on any type of processing device. Additionally, it is not necessary for each of the participating conferees to use the video-teleconferencing systems as implemented herein, in order to benefit from receiving virtual image video streams 204 produced by the video-teleconferencing system 200 as described herein.

Suppose, for illustration purposes, that video-teleconferencing system 200 represents the video conferencing system shown on the left hand side of FIG. 1 with respect to conferee A. System 200 includes cameras 108 (108T representing the camera mounted on the top of display monitor 106 and 108B representing the camera on the bottom of display monitor 106) an eye-gaze correction module 202 and display monitors 106 shown in FIG. 1. In this implementation, the cameras 108 are connected to the video-teleconferencing system 200 through 1394 IEEE links, but other types of connections protocols can be employed. The top camera 108T captures a top image view 201T of conferee A, whereas the bottom camera 108B captures a bottom image view 201B of conferee A. Each video image 201 contains an unnatural eye-gaze phenomenon from different vantage points, again making it appear as if conferee A is looking away (down or up) and not making eye contact with other conferees, such as conferee B.

The eye-gaze correction module 202 receives both images and synthesizes movements, various features and other three dimensional information from both video images to produce a virtual image video stream 204, which can be transmitted as a signal over the communication channel 102 to other participants (such as conferee B) for display on their respective display monitor 106.

Eye-Gaze Correction Module

Figure 3:
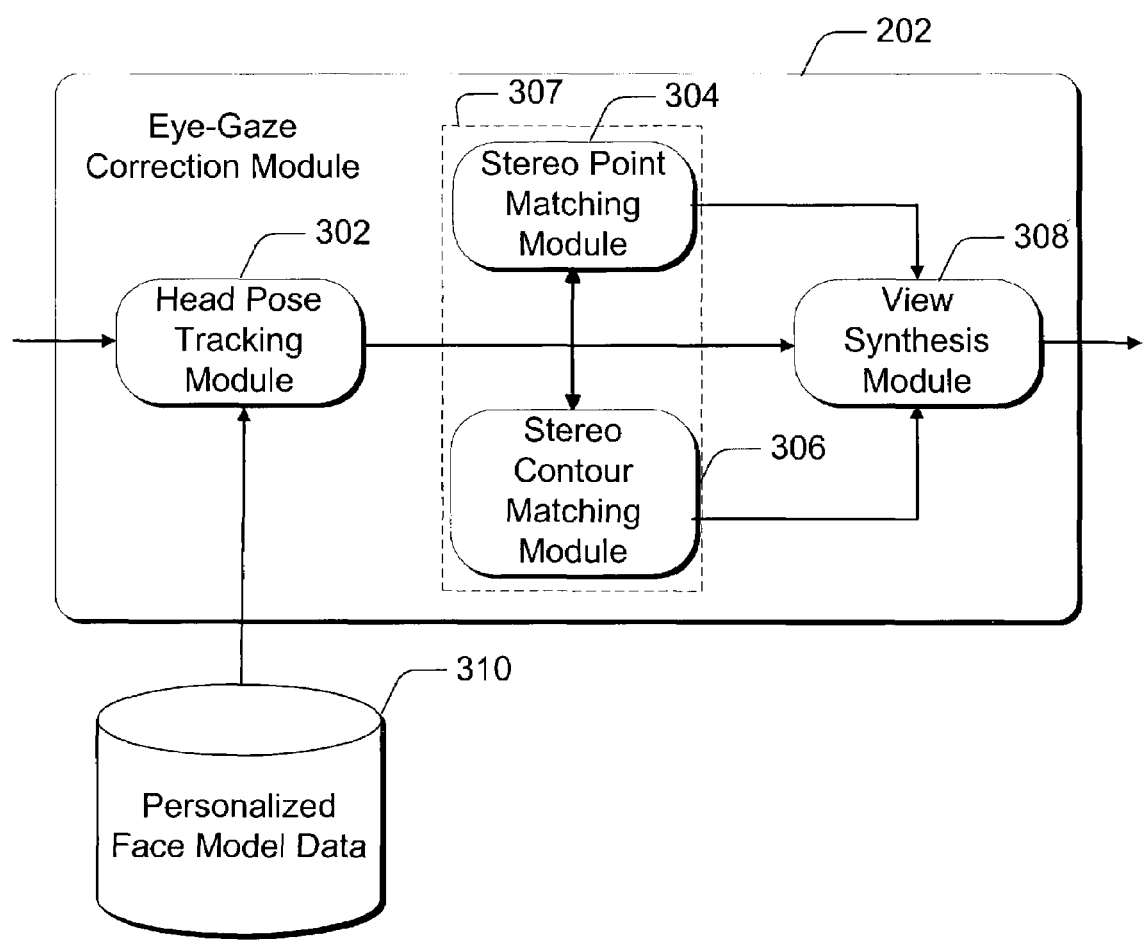
FIG. 3 shows a block diagram of the eye-gaze correction module.

FIG. 3 shows a block diagram of the eye-gaze correction module 202 according to one exemplary implementation. Eye-gaze correction module 202 includes: a head position tracking module 302, a stereo point matching module 304, a stereo contour matching module 306 and a view synthesis module 308. The functionality performed by each of these modules can be implemented in software, firmware, hardware and/or any combination of the foregoing. In one implementation, these modules are implemented as computer executable instructions that reside as program modules (see FIG. 12).

The head-pose tracking module 302 receives the video images 201 (in the form of digital frames) from the cameras 108 and automatically tracks the head position of a conferee by determining the relative positioning of the conferee's head.

In one implementation, the head-pose tracking module 302 uses a personalized three dimensional model of the conferee stored in a database 307. During an initialization phase, video images of a particular conferee's head and face are captured from different views and three-dimensional information associated with the images is stored in the database 307. The head pose tracking module 302 then uses the three-dimensional information as a reference and is able to track the head position of the same person by matching current viewed images from cameras 108 against identical points contained within the three-dimensional information. In this way, the head pose tracking module 302 is able to track the head position of a conferee in real-time with minimal processing expenditures.

In another implementation, head-pose tracking module 302 uses monocular tracking where only one camera is used. Although the example illustrated below incorporates a stereo image pair, it is contemplated that a monocular system can incorporate a head-pose tracking module 302 as shall be explained in more detail with reference to the Model-Based Head Pose Tracking section below.

The stereo point matching module 304 and the stereo contour matching module 306 form a stereo module (shown as a dashed box 307), which is configured to receive the video images 201, and automatically match certain features and contours observed from them.

The view synthesis module 308 gathers all information processed by the head-pose tracking module 302 and stereo module 307 and automatically morphs the top and bottom images 201T, 201B, based on the gathered information, to generate the virtual image video stream 204, which is transmitted as a video signal via communication channel 102.

Figure 4:
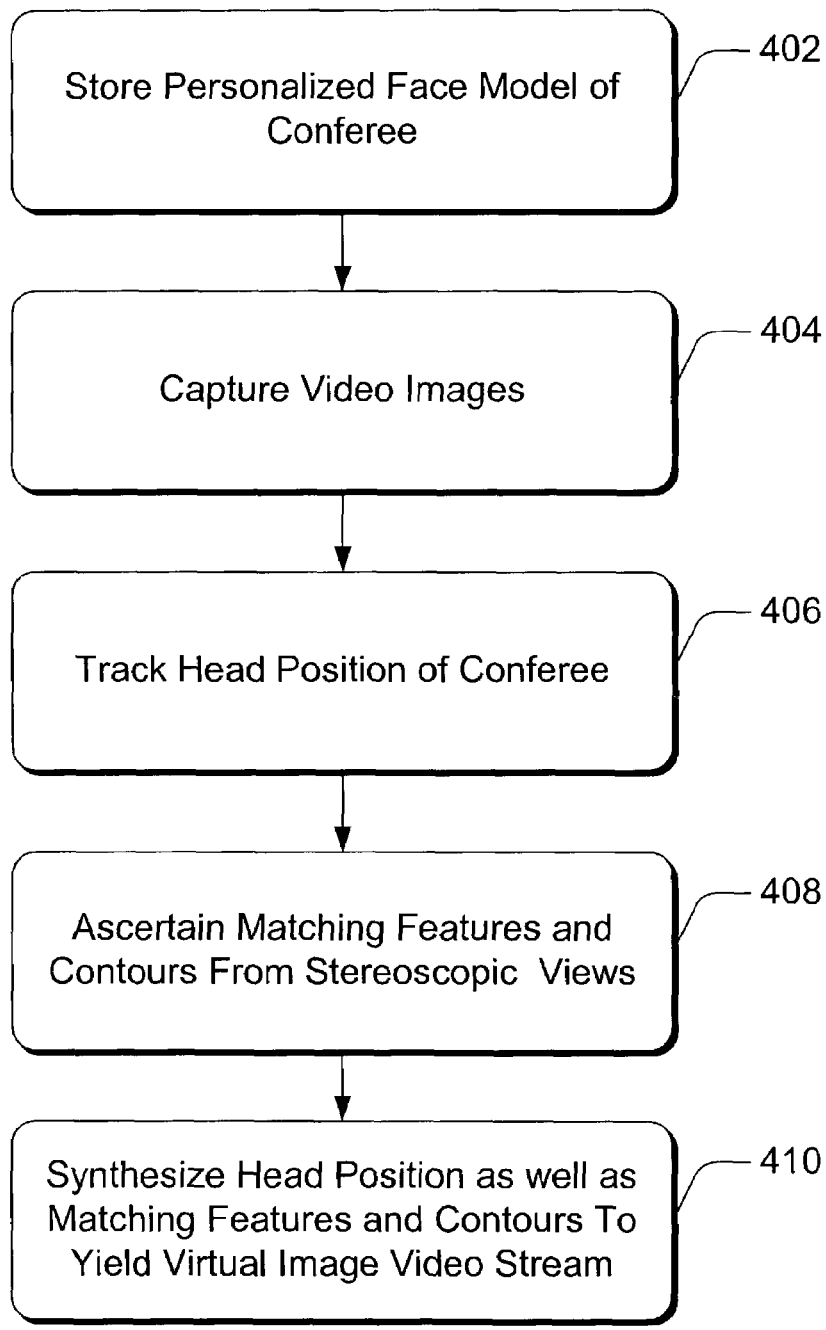
FIG. 4 is a flow chart illustrating a process of correcting for eye-gaze in video-teleconferencing systems.

FIG. 4 is a flow chart illustrating a process 400 of correcting for eye-gaze in video-teleconferencing systems. Process 400 includes operation steps 402-410. The order in which the process is described is not intended to be construed as a limitation. The steps are performed by computer-executable instructions stored in memory (see FIG. 12) in the video-teleconferencing system 200. Alternatively, the process 400 can be implemented in any suitable hardware, software, firmware, or combination thereof.

Model-Based Head Pose Tracking

Figure 5:
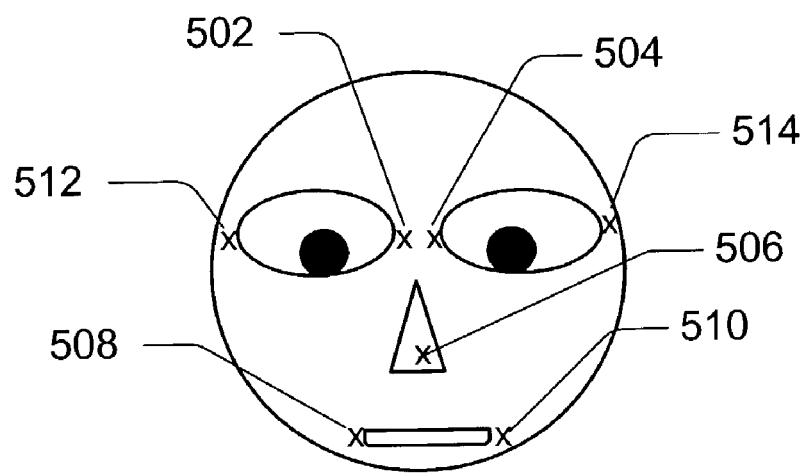
FIG. 5 shows a base image of a conferee with seven markers selected on the conferee's face used to generate a face model.

In step 402, a personalized three-dimensional face model of a conferee is captured and stored in database 307. In one implementation, the conferee's personalized face model is acquired using a rapid face modeling technique. This technique is accomplished by first capturing data associated with a particular conferee's face. The conferee sits in front of cameras 108 and records video sequences of his head from right to left or vise versa. Two base images are either selected automatically or manually. In one implementation the base images are from a semi-frontal view of the conferee. Markers are then automatically or manually placed in the two base images. For example, FIG. 5 shows a base image of a conferee with seven markers 502, 504, 506, 508, 510, 512, 514 selected on the conferee's face used to generate a face model. The markers 502-510 correspond to the two inner eye corners, 502, 504, top of nose 506, two mouth corners 508,. 510 and outside eye corners 512 and 514. Other fixed point markers (more or less) could be selected.

Figure 6:
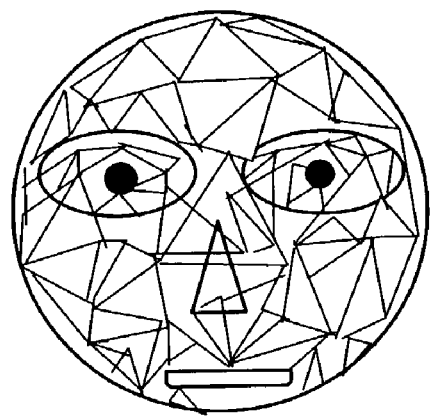
FIG. 6 shows a sample geometric version of a face model.

The next processing stage computes a face mesh geometry and the head pose with respect to the cameras 108 using the two base images and markers as inputs. A triangular mesh consisting of approximately 300 triangles per face is generated. FIG. 6 shows a sample geometric version of a face model. Each geometric vertex in the mesh has semantic information, i.e., chin, etc. A personalized face model for each conferee is stored in database 307, prior to being able to conduct a video teleconference.

Each camera 108 is modeled as pinhole, and its intrinsic parameters are captured in 3×3 matrix. The intrinsic matrices for the stereo pair are denoted by $A_0$ and $A_1$, respectively. Without loss of generality, one of the camera (either top 108T or bottom 108B) is selected as the world coordinate system. The other camera's coordinate system is related to the aforementioned selected camera by a rigid transformation ($R_{10}$, $T_{10}$). Thus a point m in three dimensional (3D) space is projected to the image places of the stereo cameras 108 by $$p = \Phi(A_0 m) \quad \text{(eq. 1)}$$

$$q = \Phi(A_1(R_{10} m + t_{10})) \quad \text{(eq. 2)}$$

where p and q are the image coordinates in cameras 108T and 108B, and $\Phi$ is a 3D-2D projection function such that $$\Phi \begin{bmatrix} u \\ v \\ w \end{bmatrix} = \begin{bmatrix} u/w \\ v/w \end{bmatrix}.$$

The parameters $A_0$, $A_1$, $R_{10}$, and $t_{10}$ are determined during the setup of the stereovision system using any standard camera calibration technique. In this implementation, we use Zhang's plane-based technique that calibrates the cameras from observation of a planar pattern shown in several different orientations.

The face model is described in its local coordinate system. The goal of the head pose tracking module 302 is to determine rigid motion of the head (head pose) in the world coordinate system. The head pose is represented by a 3-by-3 rotation matrix R and a 3D translation vector t. The head pose requires six parameters, since a rotation has three degrees of freedom. For more detailed information on how the face model can be generated see U.S. patent application Ser. No. 09/754,938, entitled "Rapid Computer Modeling of Faces for Animation," filed Jan. 4, 2001, to Liu et al. commonly owned with this application and is incorporated herein by reference in its entirety.

Once the personalized face model is generated and stored, a conferee can conduct a video teleconference and take advantage of the eye-gaze correction module 202. Referring back to FIG. 4, in steps 404 and 406 a video teleconference is initiated by a conferee and a pair of images is captured from cameras 108T, 108B. Stereo tracking is the next operation step performed by the head pose tracking module 302.

Figure 7:
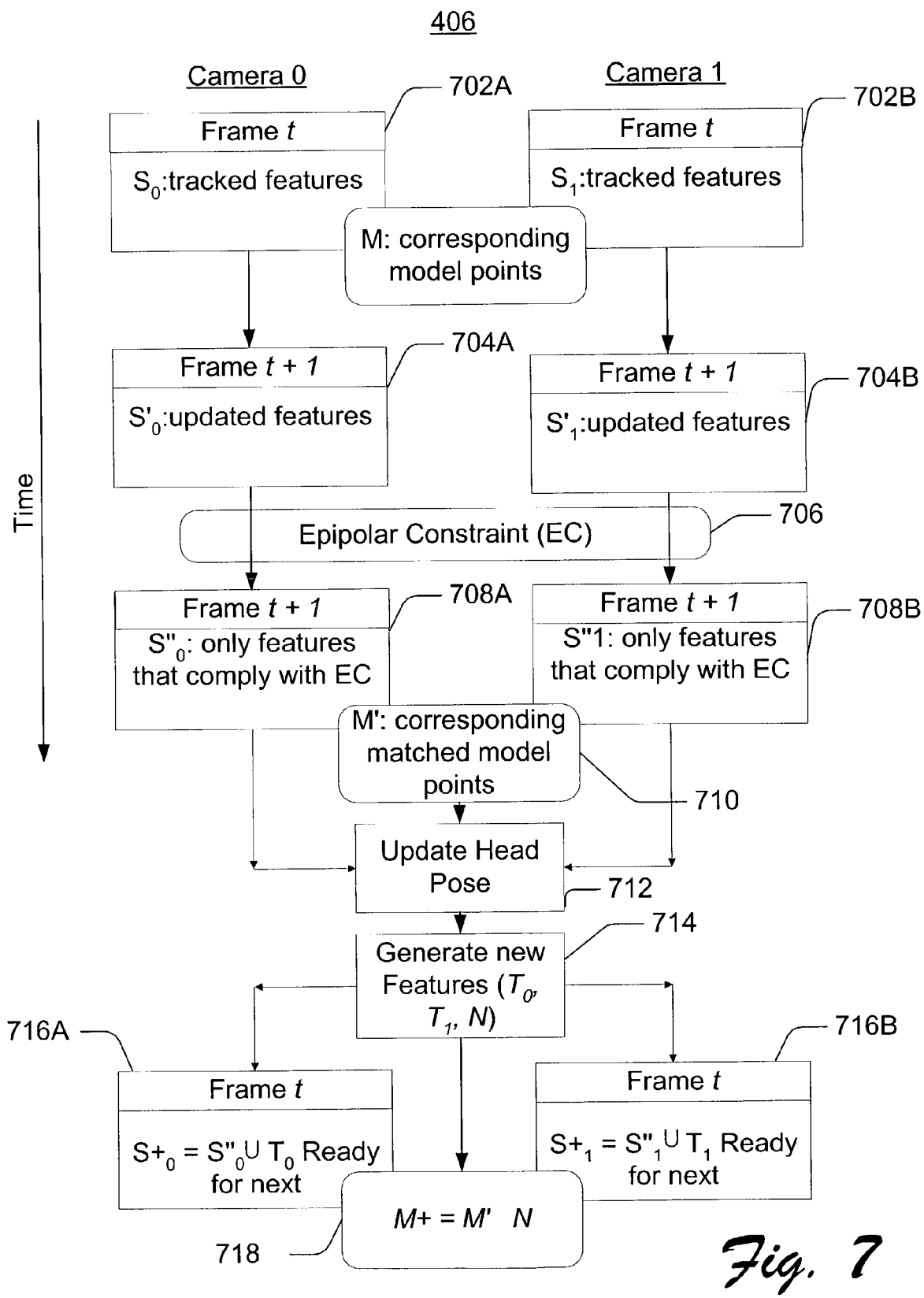
FIG. 7 is a time diagram illustrating a model-based stereo head position tracking process, which corresponds to operational step 406 of FIG. 4.

FIG. 7 is a time diagram illustrating a model-based stereo head position tracking process, which corresponds to operational step 406 of FIG. 4. Process 406 includes operational steps 702-718. In one implementation, given a pair of stereo images $I_{0,t}$ and $I_{1,t}$ at time t, received from cameras 0 and 1 (i.e., 108T and 108B), two sets of matched 2D points $S_0=\{p=[u, v]^T\}$ and $S1=\{q=[a, b]^T\}$ from that image pair, their corresponding 3D points $M=\{m=[x, y, z]^T\}$, and a pair of stereo images $I_{0,t+1}$ and $I_{1,t+1}$: the tracking operation determines (i) a subset $M' \subseteq M$ whose corresponding p's and q's have matched denoted by $S'_0=\{p'\}$ and $S'_1=\{q'\}$, in $I_{0,t+1}$ and $I_{1,t+1}$, and (ii) the head pose (R,t) so that the projections of $m \in M'$ are p' and q'.

In steps 702 and 704, an independent feature tracking feature for each camera from time t to t+1 is conducted. This can be implemented through a KLT tracker, see e.g., J. Shi and C. Tomasi, *Good Features to Track*, in the IEEE *Conf. on Computer Vision and Pattern Recongnition*, pages 593-600, Washington, June 1994. Nevertheless, the matched points may be drifted or even incorrect. Therefore, in step 706, epipolar constraint states are applied to remove any stray points. The epipolar constraint states that if a point $p=[u,v,1]^T$ (expressed in homogenous coordinates) in the first image and point $q=[a, b,1]^T$ in the second image corresponding to the same 3D point m in the physical world, then they must satisfy the following equation:

$$q^T F p = 0 \quad \text{(eq. 3)}$$

where F is the fundamental matrix[2] that encodes the epipolar geometry between the two images. Fp defines the epipolar line in the second image, thus Equation (3) states that the point q must pass through the epipolar line Fp, and visa versa.

In practice, due to inaccuracy in camera calibration and feature localization, it is not practical to expect the epipolar constraint to be satisfied exactly in steps 706 and 708. For a triplet (p', q', m) if the distance from q' to the p's epipolar line is greater than a certain threshold, this triplet is considered to be an outlier and is discarded. In one implementation, a distances threshold of three pixels is used.

After all the stray points that violate the epipolar constraint have been effectively removed in steps 706 and 708, the head pose (R, t) is updated in steps 710 and 712, so that the re-projection error of m to p' and q' is minimized. The re-projection error e is defined as:

$$e = \sum_i \left( \left\| p'_i - \phi(A_0(R m_i + t)) \right\|^2 + \left\| q'_i - \phi(A_1[R_{10}(R m_i + t) + t_{10}]) \right\|^2 \right) \quad \text{(eq. 4)}$$

(R, t) parameters are solved using the Levenberg-Marquardt algorithm with the head pose at time t being used as the initial point in time.

After the head pose is determined in step 712, then in steps 714, 716 and 718 feature regeneration is used to select more feature points that are "good." That is, the matched set $S'_0$, $S'_1$ and M' are replenished by adding good feature points. The good feature points are selected based on the following criteria:

Texture: Generally, the feature point in the images having the richest texture information facilitates the tracking. A first 2D point is selected in the image using the criteria described in J. Shi and C. Tomasi, *Good Features to Track*, in the IEEE *Conf. on Computer Vision and Pattern Recongnition*, pages 593-600, Washington, June 1994, then back-project them back onto the face model stored in memory 307 to ascertain their corresponding model points.

Visibility: The feature point should be visible in both images. An intersection routine is used to return the first visible triangle given an image point. A feature point is visible if the intersection routine returns the same triangle for its projections in both images.

Rigidity: Feature points in the non-rigid regions of the face, such as the mouth region, should not be added as feature points. Accordingly, a bounding box is used around the tip of the nose that covers the forehead, eyes, nose and cheek region. Any points outside this bounding box are not added to the feature set.

Feature regeneration improves the head pose tracking in several ways. It replenishes the feature points lost due to occlusions or non-rigid motion, so the tracker always has a sufficient number of features to start with in the next frame. This improves the accuracy and stability of the head pose tracking module 302. Moreover, the regeneration scheme alleviates the problem of a tracker drifting by adding fresh features at every frame.

Figure 8:
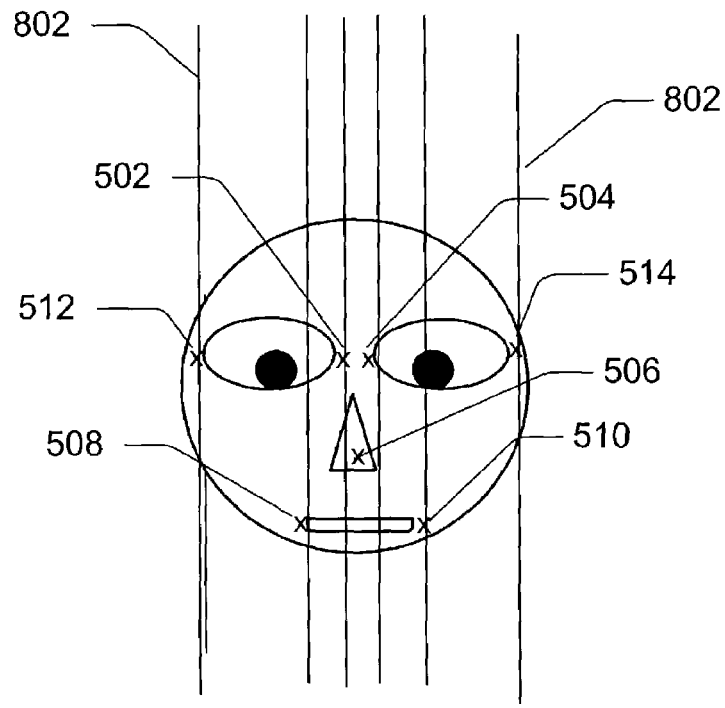
FIG. 8 shows a base image (from either camera) of a conferee with seven markers selected on the conferee's face where epipolar lines are drawn.

As part of the tracked features in steps 702 and 704, it is important that head pose at a time 0 is used to start tracking. A user can select feature points from images produced by both cameras. FIG. 8 shows a base image (from either camera) of a conferee with seven markers 502, 504, 506, 508, 510, 512, 514 selected on the conferee's face where epipolar lines 802 are drawn. The selected markers do not have to be precisely selected and the selection can be automatically refined to satisfy the epipolar constraint.

The initial selection is also used for tracking recovery when tracking is lost. This may happen when the user moves out of the cameras 108 field of view or rotates his head away from the cameras. When he turns back to the cameras 108, it is preferred that tracking is resumed with minimum or no human intervention. During the tracking recovery process, the initial set of landmark points 502-514, are used as templates to find the best match in the current image. When a match with a high confidence value is found, the tracking continues with normal tracking as described with reference to FIG. 7.

Furthermore, the auto-recovery process is also activated whenever the current head pose is close to the initial head pose. This further alleviates the tracking drifting problem, and accumulative error is reduced after tracker recovery. This scheme could be extended to include multiple templates at different head poses.

Although a stereo example is described above it is possible to implement tracking by applying FIG. 7 to a monocular system. In such a system the epipolar constraints would not be performed, but the concept of using a model-based system and tracking features with respect to one camera could easily be performed with reference to either camera 0 or camera 1, independently. In this case, the objective function for head pose estimation is the following re-projection error e:

$$e = \sum_i \|p_i' - \phi(A_0(Rm_i + t))\|^2 \quad \text{(eq. 5)}$$

(R, t) parameters are solved using the Levenberg-Marquardt algorithm with the head pose at time t being used as the initial point. It should be noted, however, that a model-based monocular tracking systems implemented with reference to either camera 0 or camera 1 with respect to FIG. 7, are generally not as accurate as model-based stereo tracking systems. Thus, stereo cameras (camera 0 and camera 1 used together) enable the head-pose tracking module 302 to achieve a higher level of robustness than a monocular implementation of module 302.

Stereo View Matching (Stereo Point & Stereo Contour Matching Modules)

Figure 9:
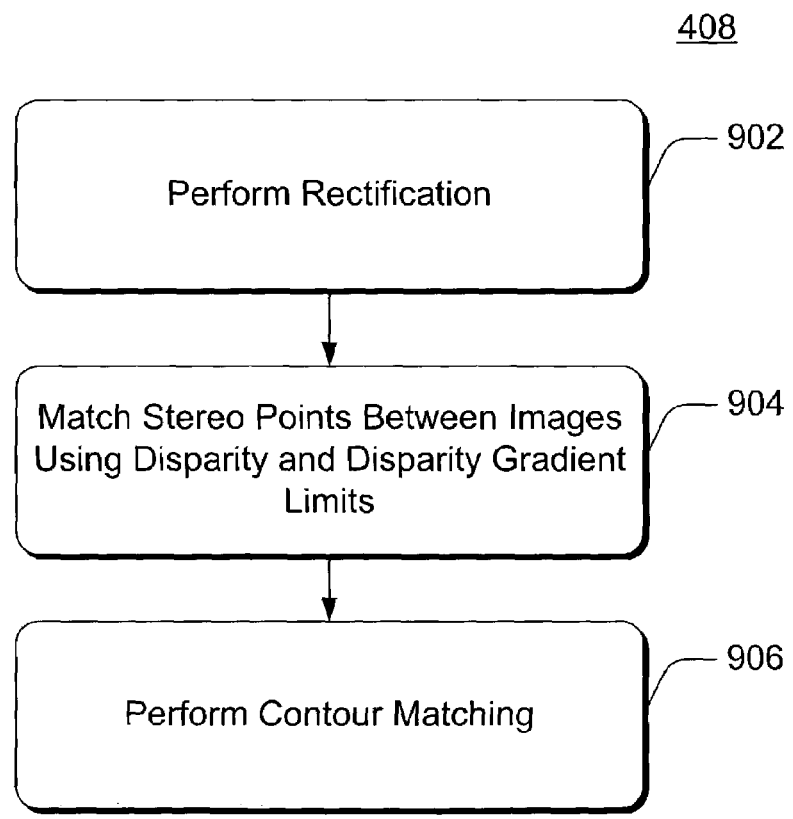
FIG. 9 is a flow chart illustrating operational steps for performing step 408 in FIG. 4.

Results from tracking the 3D head position of a conferee in step 406 of FIG. 4, should provide a good set of matches within the rigid part of the face between the stereo pairs of images. To generate convincing photo-realistic virtual views, it is useful to find more matching points over the entire foreground of images; such as along the contour and the non-rigid parts of the face. Accordingly, in step 408 of FIG. 4, matching features and contours from the stereoscopic views are ascertained. FIG. 9 is a flow chart illustrating operational steps for performing process step 408 in FIG. 4. Process 408 includes operation steps 902-906, which generally involve both feature (e.g. point and contour) matching and template matching to locate as many matches as possible. During this matching process, reliable 3D information obtained from step 406 is used to reduce the search ranges. In areas where information is not available, however, the search threshold is relaxed. A disparity gradient limit (to be described) is used to remove false matches. In step 902, the images 201T and 201B are rectified to facilitate the stereo matching (and later view synthesis). An example way to implement the rectification process is described in C. Loop and Z. Zhang, *Computing Rectifying Homographies for Stereo Vision*, IEEE Conf. Computer Vision and Pattern Recognition, volume I, pages 125-131, June 1999, whereby the epipolar lines are horizontal.

Disparity and Disparity Gradient Limit

In step 904, stereo point matching is performed using disparity gradients. Disparity is defined for parallel cameras (i.e., the two image planes are the same) and this is the case after having performed stereo rectification to align the horizontal axes in both images 201. Given a pixel (u,v) in the first image and its corresponding pixel (u',v') in the second image, disparity is defined as d=u'-u (where v=v' as images have been rectified). Disparity is inversely proportional to the distance of the 3D point to the cameras 108. A disparity of zero implies that the 3D point is at infinity.

Consider now two 3D points whose projections are $m_1 = [u_1, v_1]^T$ and $m_2 = [u_2, v_2]^T$ in the first image, and $m'_1 = [u'_1, v'_1]^T$ and $m'_2 = [u'_2, v'_2]^T$ in the second image. Their disparity gradient is defined to be the ratio of their difference in disparity to their distance in the cyclopean image, i.e., $$DG = \left| \frac{d_2 - d_1}{u_2 - u_1 + (d_2 - d_1)/2} \right| \quad \text{(eq. 5)}$$

Experiments in psychophysics have provided evidence that human perception imposes the constraint that the disparity gradient DG is upper-bounded by a limit K. The theoretical limit for opaque surfaces is 2 to ensure that the surfaces are visible to both eyes. Less than ten percent (10%) of world surfaces viewed at more than 26 cm with 6.5 cm of eye separation present a disparity gradient larger than 0.5. This justifies the use of a disparity gradient limit well below the theoretical value of (of 2) without potentially imposing strong restrictions on the world surfaces that can be fused by operation step 408. In one implementation, a disparity gradient limit of 0.8 (K=0.8) was selected.

Feature Matching Using Correlation

For unmatched good features in the first image (e.g., upper video image 201T) the stereo point matching module 304 searches for corresponding points, if any, in the second image (e.g. lower video image 201B) by template matching. In one implementation a normalized correlation over a 9×9 window is used to compute the matching score. The disparity search range is confined by existing matched points from head pose tracking module 302, when available.

Combined with matched points from tracking a sparse disparity map for the first image 201T is built and stored in memory. Potential outliers (e.g., false matches) that do not satisfy the disparity gradient limit principle are filtered from the matched points. For example, for a matched pixel m and neighboring matched pixel n, the stereo point matching module 304 computes their disparity gradient between them using the formulas described above. If $DG \leq K$, a good match vote is tallied by the module 304 for m, otherwise, bad vote is registered for m. If the "good" votes are less than the "bad" votes, m is removed from the disparity map. This process in step 904, is conducted for every matched pixel in the disparity map; resulting in disparity map that conforms to the principle of disparity gradient limit as described above.

Contour Matching

In step 906, contour matching is performed by the stereo contour matching module 306. Template matching assumes that corresponding image patches present some similarity. This assumption, however, may be incorrect at occluding boundaries, or object contours. Yet object contours are cues for view synthesis module 308. The lack of matching information along object contours will result in excessive smearing or blurring in the synthesized views. Therefore, the stereo contour matching module 306 is used to extract and match the contours across views in eye-gaze correction module 202.

The contour of a foreground object can be extracted after background subtraction. In one implementation, it is approximated by polygonal lines using the Douglas-Poker algorithm, see, i.e., D. H. Douglas and T. K. Peucker, *Algorithms for the Reduction of the Number of Points Required to Represent a Digitized Line or Its Caricature*, Canadian Cartographer, 10(2):112-122, (1973). The control points on the contour are further refined in to sub-pixel accuracy using the "snake" technique, see i.e., M. Kass, A Witkin, and D. Terzopoulos, *Snake: Active Contour Models*, International Journal of Computer Vision, 1(4): 321-331 (1987). Once two polygonal contours, denoted by P={$v_I$|I=1 ... n} in the first image and P'={$v'_I$|I=1 ... m} in the second image, the contour module 306 uses a dynamic programming technique (DP) to find the global optimal match across them.

Figure 10:
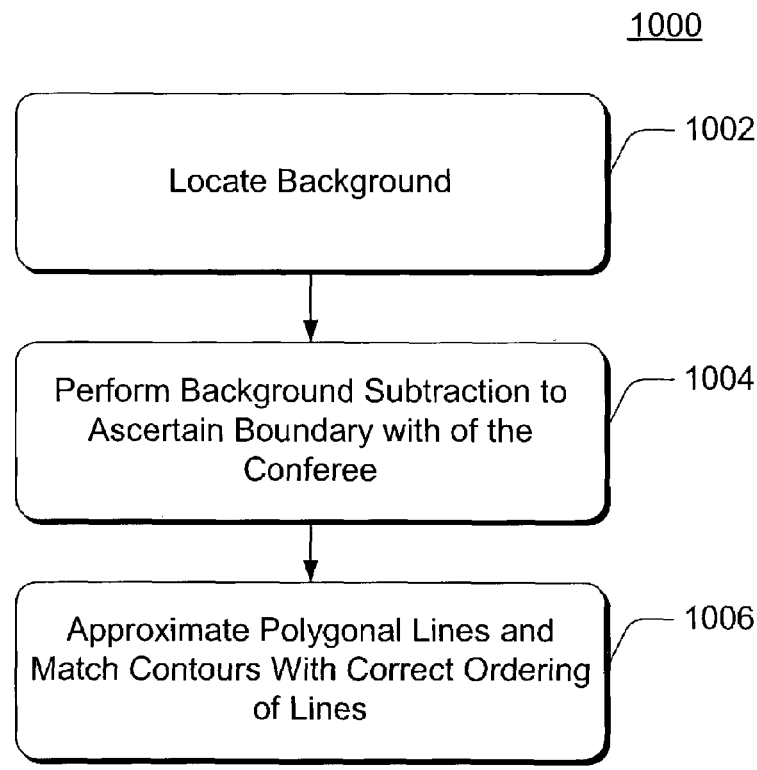
FIG. 10 is a flow chart illustrating an exemplary process for dynamic programming used to ascertain the contour of an object.
Figure 11:
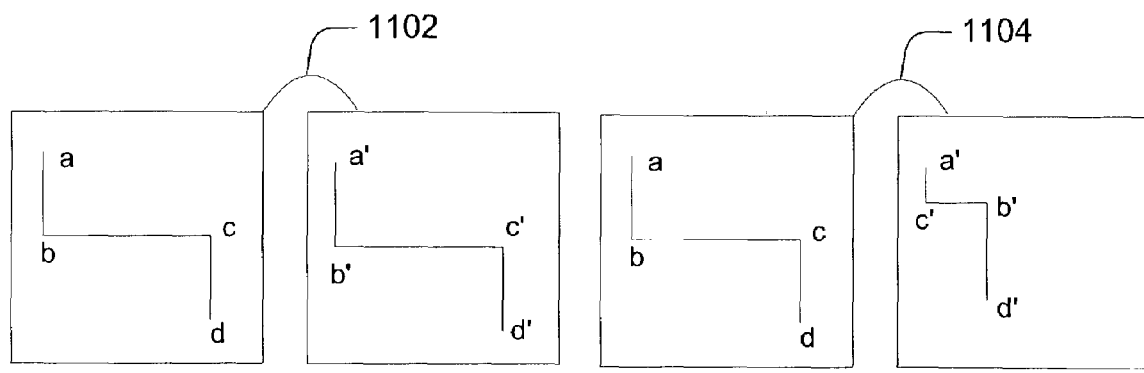
FIG. 11 shows two sets of images: the first set, denoted by 1102, have matching line segments in the correct order and the second set, denoted by 1104, which have line segments that are not in correct order.

FIG. 10 is a flow chart illustrating an exemplary process 1000 for dynamic programming used to ascertain the contour of an object. Process 1000 includes operational steps 1002-1006. In step 1000, an image of the background without the conferee's head is taken from each camera. This can be done at the setup of the system or at the beginning of the teleconferencing session. In step 1004, the background is subtracted from the conferee's head resulting in the contour of the conferee. Finally, in step 1006, approximate polygonal lines are assigned to the contours of the conferee's head and they are matched between views to ensure correct order of the polygonal lines is preserved. FIG. 11 shows two sets of images: the first set, denoted by 1102, have matching line segments in the correct order and the second set, denoted by 1104, which have line segments that are not in the same order.

View Synthesis

Referring back to FIG. 4, from the previous operational steps 402-408, the eye-gaze correction module 202 has obtained a set of stereo point matches and contour line matches that could be used for synthesis into a new virtual view, such as virtual image video stream 204. In step 410, the view synthesis module 308 can be implemented in several ways to synthesize the information from steps 402-408, to produce the virtual image video stream 204. In one exemplary implementation, the view synthesis module 308 functions by view morphing, such as described in S. M. Seitz and C. R. Dyer, *View Morphing*, SIGGRAPH 96 Conference Proceedings, volume 30 of Annual Conference Series, pages 21-30, New Orleans, La., 1996, ACM SIGGRAPH, Addison Wesley. View morphing allows is synthesis of virtual views along the path connecting the optical centers of the cameras 108. A view morphing factor $c_m$ controls the exact view position. It is usually between 0 and 1, whereas a value of 0 corresponds exactly to the first camera view, and a value of 1 corresponds exactly to the second camera view. Any value in between, represents some point along the path from the first camera to the second.

In a second implementation, the view synthesis module 308 is implemented with the use of hardware assisted rendering. This is accomplished by first creating a 2D triangular mesh using Delaunay triangulation in the first camera's image space (either 108T or 108B). The vertex's coordinates are then offset by its disparity modulated by the view morphing factor $c_m$, $[u'_I, v'_I] = [u_I + c_m d_I, v_I]$. The office mesh is fed to a hardware render with two sets of texture coordinates, one for each camera image. We use Microsoft DirectX, a set of low-level application programming interfaces for creating high-performance multimedia applications. It includes support for 2D and 3D graphics and many modern graphics cards such as GeForce from NVIDIA for hardware rendering. Note that all images and the mesh are in the rectified coordinate space, so it is necessary to set the viewing matrix to the inverse of the rectification matrix to "un-rectify" the resulting image to its normal view position. This is equivalent to "post-warp" in view morphing. Thus, the hardware can generate the final synthesized view in a single pass.

In addition to the aforementioned hardware implementation, it is possible to use a weighting scheme in conjunction with the hardware to blend the two images. The weight $W_I$ for the vertex $V_i$ is based on the product of the total area of adjacent triangles and the view-morphing factor, as $$W_i = \frac{(1-c_m)\sum S_i^1}{(1-c_m)\sum S_i^1 + c_m \sum S_i^2}$$

where $S_i^1$ are the areas of the triangles of which $V_I$ is a vertex, and $S_i^2$ are the areas of the corresponding triangles in the other image. By modifying the view morphing factor $c_m$, it is possible to use the graphics hardware to synthesize correct views with desired eye gaze in real-time, and spare the CPU for more challenging tracking and matching tasks.

Comparing the two implementations, the hardware-assisted implementation, aside from faster speeds, generates crisper results if there is no false match in the mesh. On the other hand, the view morphing implementation is less susceptible to bad matches, because it is essentially uses every matched point or line segment to compute the final coloring of single pixel, while in the hardware-based implementation, only the three closest neighbors are used.

Exemplary Computing System and Environment

Figure 12:
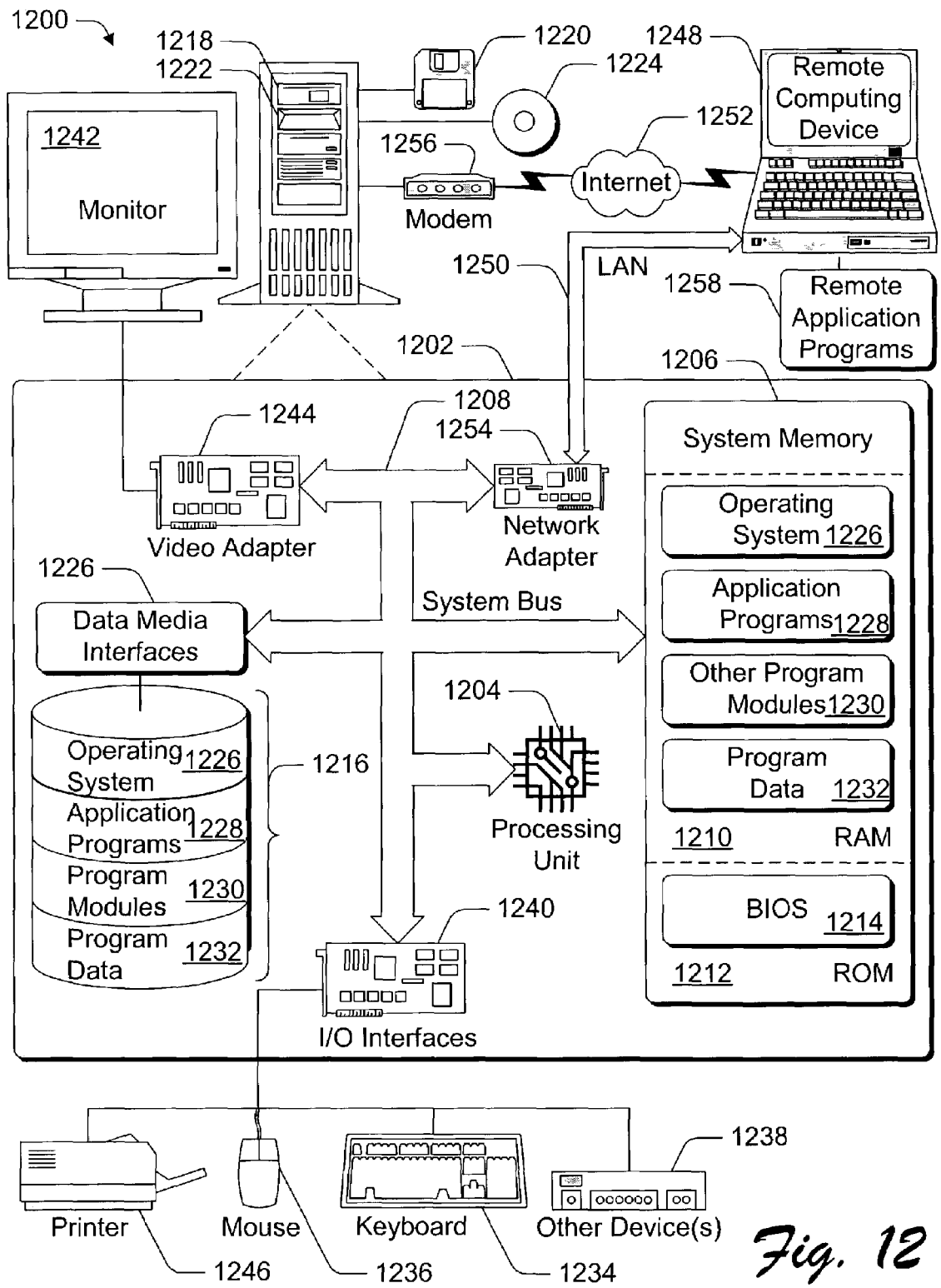
FIG. 12 illustrates an example of a computing environment 1200 within which the computer, network, and system architectures described herein can be either fully or partially implemented.

FIG. 12 illustrates an example of a computing environment 1200 within which the computer, network, and system architectures (such as video conferencing system 200) described herein can be either fully or partially implemented. Exemplary computing environment 1200 is only one example of a computing system and is not intended to suggest any limitation as to the scope of use or functionality of the network architectures. Neither should the computing environment 1200 be interpreted as having any dependency or requirement relating to any one or combination of components illustrated in the exemplary computing environment 1200.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, mini-computers, mainframe computers, gaming consoles, distributed computing environments that include any of the above systems or devices, and the like.

The eye-gaze correction module 202 may be described in the general context of computer-executable instructions, such as program modules, being executed by a computer. Generally, program modules include routines, programs, objects, components, data structures, etc. that perform particular tasks or implement particular abstract data types. The eye-gaze correction module 202 may also be practiced in distributed computing environments where tasks are performed by remote processing devices that are linked through a communications network. In a distributed computing environment, program modules may be located in both local and remote computer storage media including memory storage devices.

The computing environment 1200 includes a general-purpose computing system in the form of a computer 1202. The components of computer 1202 can include, by are not limited to, one or more processors or processing units 1204, a system memory 1206, and a system bus 1208 that couples various system components including the processor 1204 to the system memory 1206.

The system bus 1208 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 1202 typically includes a variety of computer readable media. Such media can be any available media that is accessible by computer 1202 and includes both volatile and non-volatile media, removable and non-removable media. The system memory 1206 includes computer readable media in the form of volatile memory, such as random access memory (RAM) 1210, and/or non-volatile memory, such as read only memory (ROM) 1212. A basic input/output system (BIOS) 1214, containing the basic routines that help to transfer information between elements within computer 1202, such as during start-up, is stored in ROM 1212. RAM 1210 typically contains data and/or program modules that are immediately accessible to and/or presently operated on by the processing unit 1204.

Computer 1202 can also include other removable/non-removable, volatile/non-volatile computer storage media. By way of example, FIG. 12 illustrates a hard disk drive 1216 for reading from and writing to a non-removable, non-volatile magnetic media (not shown), a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1226. Alternatively, the hard disk drive 1216, magnetic disk drive 518, and optical disk drive 1222 can be connected to the system bus 1208 by a SCSI interface (not shown).

The disk drives and their associated computer-readable media provide non-volatile storage of computer readable instructions, data structures, program modules, and other data for computer 1202. Although the example illustrates a hard disk 1216, a removable magnetic disk 1220, and a removable optical disk 1224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1216, magnetic disk 1220, optical disk 1224, ROM 1212, and/or RAM 1210, including by way of example, an operating system 526, one or more application programs 1228, other program modules 1230, and program data 1232. Each of such operating system 1226, one or more application programs 1228, other program modules 1230, and program data 1232 (or some combination thereof) may include an embodiment of the eye-gaze correction module 202.

Computer system 1202 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1202 via input devices such as a keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to the processing unit 1204 via input/output interfaces 1240 that are coupled to the system bus 1208, but may be connected by other interface and bus structures, such as a parallel port, game port, or a universal serial bus (USB).

A monitor 1242 or other type of display device can also be connected to the system bus 1208 via an interface, such as a video adapter 1244. In addition to the monitor 1242, other output peripheral devices can include components such as speakers (not shown) and a printer 1246 which can be connected to computer 1202 via the input/output interfaces 1240.

Computer 1202 can operate in a networked environment using logical connections to one or more remote computers, such as a remote computing device 1248. By way of example, the remote computing device 1248 can be a personal computer, portable computer, a server, a router, a network computer, a peer device or other common network node, and the like. The remote computing device 1248 is illustrated as a portable computer that can include many or all of the elements and features described herein relative to computer system 1202.

Logical connections between computer 1202 and the remote computer 1248 are depicted as a local area network (LAN) 1250 and a general wide area network (WAN) 1252. Such networking environments are commonplace in offices, enterprise-wide computer networks, intranets, and the Internet. When implemented in a LAN networking environment, the computer 1202 is connected to a local network 1250 via a network interface or adapter 1254. When implemented in a WAN networking environment, the computer 1202 typically includes a modem 1256 or other means for establishing communications over the wide network 1252. The modem 1256, which can be internal or external to computer 1202, can be connected to the system bus 1208 via the input/output interfaces 1240 or other appropriate mechanisms. It is to be appreciated that the illustrated network connections are exemplary and that other means of establishing communication link(s) between the computers 1202 and 1248 can be employed.

In a networked environment, such as that illustrated with computing environment 1200, program modules depicted relative to the computer 1202, or portions thereof, may be stored in a remote memory storage device. By way of example, remote application programs 1258 reside on a memory device of remote computer 1248. For purposes of illustration, application programs and other executable program components, such as the operating system, are illustrated herein as discrete blocks, although it is recognized that such programs and components reside at various times in different storage components of the computer system 1202, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, comprising:
   receiving initial video images representative of a conferee's head;
   evaluating the initial video images to form an initial reference model having initial features to monitor a head position of the conferee;
   tracking the head position of the conferee using updates to the initial features as subsequent video images are received; and
   activating an auto-recovery tracking process using the initial reference model that does not included the updates when tracking of the conferee's head is temporarily interrupted.

2. The method as recited in claim 1, wherein the reference model is a three-dimensional personalized face model of the conferee.

3. The method as recited in claim 1, further comprising building the reference model during a learning stage and storing the reference model in a database.

4. The method as recited in claim 1, further comprising assigning markers to the reference model and searching the received video images of the conferee's head for points that match the markers in the reference model.

5. The method as recited in claim 1, wherein the reference model includes a triangular mesh, approximating features of the conferee's head, wherein vertexes of the triangular mesh include geometric and semantic information, which correspond to the features.

6. One or more computer-readable media comprising computer-executable instructions that, when executed, perform the method as recited in claim 1.

7. A system, comprising:
   means for receiving initial video images representative of a conferee's head;
   means for evaluating the initial video images to form an initial reference model having initial features to monitor a head position of the conferee;
   means for tracking the head position of the conferee using updates to the initial features as subsequent video images are received; and
   means for activating an auto-recovery tracking process using the initial reference model that does not included the updates when tracking of the conferee's head is temporarily interrupted.

8. The system as recited in claim 7, wherein the reference model is a three-dimensional personalized face model of the conferee.

9. The system as recited in claim 7, further comprising means for building the reference model during a learning stage and storing the reference image in a database.

10. The system as recited in claim 7, further comprising means for assigning markers to the reference model and means for searching the received video images of the conferee's head for points that match the markers in the reference model.

11. The system as recited in claim 7, wherein the reference model includes a triangular mesh, approximating features of the conferee's head, wherein vertexes of the triangular mesh include geometric and semantic information, which correspond to the features.

12. One or more computer-readable media having stored thereon computer executable instructions that, when executed by one or more processors, causes the one or more processors of a computer system to:
   store a personalized face model of a conferee;
   receive initial video images representative of the conferee's face;
   evaluate the initial video images to form an initial reference model having initial features to monitor a head position of the conferee;
   track the head position of the conferee using updates to the initial features as subsequent video images are received; and
   activate an auto-recovery tracking process using the initial reference model that does not included the updates, if the tracking of the conferee's head is temporarily interrupted.

13. One or more computer-readable media as recited in claim 12, wherein the reference model is a three-dimensional personalized face model of the conferee.

14. One or more computer-readable media as recited in claim 12, further comprising computer executable instructions that, when executed, direct the computer system to build the personalized face model during a learning stage and store the personalized face model in a database.

15. One or more computer-readable media as recited in claim 12, further comprising computer executable instructions that, when executed, direct the computer system to assign markers to the personalized face model and search the received video images of the conferee's face for points that match the markers in the personalized face model.

16. One or more computer-readable media as recited in claim 12, wherein the reference model includes a triangular mesh, approximating features of the conferee's face, wherein vertexes of the triangular mesh include geometric and semantic information, which correspond to the features.

* * * * *